T. F. HORNUNG.
WATER SUPPLY SYSTEM.
APPLICATION FILED MAR. 5, 1913.

1,077,473.

Patented Nov. 4, 1913.

WITNESSES:

INVENTOR
T. F. Hornung
BY
ATTORNEY

UNITED STATES PATENT OFFICE.

TIMOTHY F. HORNUNG, OF SACRAMENTO, CALIFORNIA.

WATER-SUPPLY SYSTEM.

1,077,473.

Specification of Letters Patent.

Patented Nov. 4, 1913.

Application filed March 5, 1913. Serial No. 752,082.

*To all whom it may concern:*

Be it known that I, TIMOTHY F. HORNUNG, a citizen of the United States, residing at Sacramento, in the county of Sacramento and State of California, have invented certain new and useful Improvements in Water-Supply Systems, of which the following is a specification.

The present invention relates to a means for maintaining constant the head pressure at the discharge outlets of water distribution systems, and is particularly designed to be employed in connection with irrigation systems generally, where measured quantities of water are sold, and has for its principal object to insure the purchaser the required pressure or head of water purchased, and to prevent the purchaser from obtaining a greater pressure or head of water than that paid for, and at the same time providing against the loss of water which otherwise would run to waste by an overflow thereof on the outlet therefor being closed.

Another and important object is to provide a means capable of performing the above objects, which is simple in construction and thoroughly efficient in all of its operations.

With the above mentioned and other objects in view, the invention consists in the novel construction and combination of parts hereinafter described, illustrated in the accompanying drawing, and pointed out in the claims hereto appended; it being understood that various changes in the form, proportion, size and minor details of construction within the scope of the appended claims may be resorted to without departing from the spirit or sacrificing any of the advantages of the invention.

To more fully comprehend the invention, reference should be had to the accompanying drawing forming a part of this specification and wherein—

Figure 1:
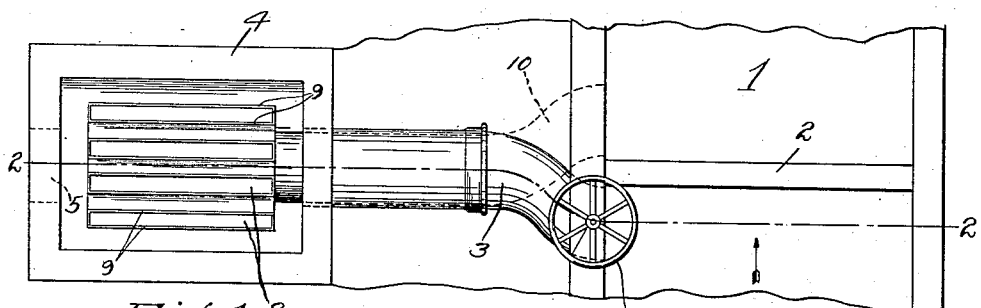
Figure 2:
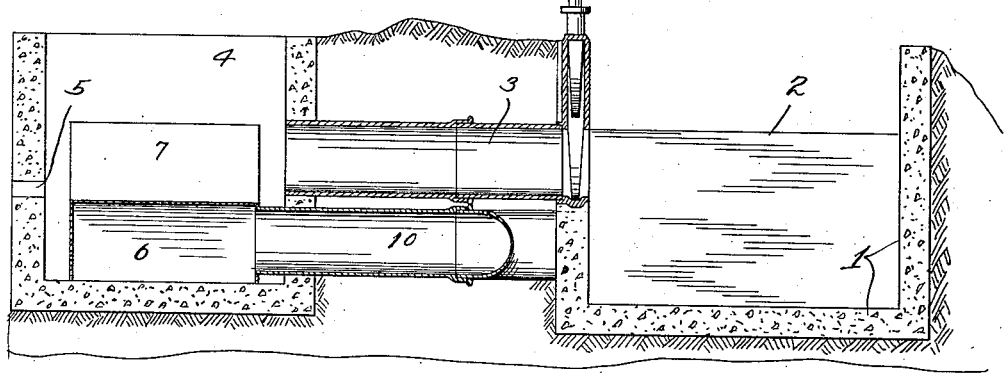
Figure 3:
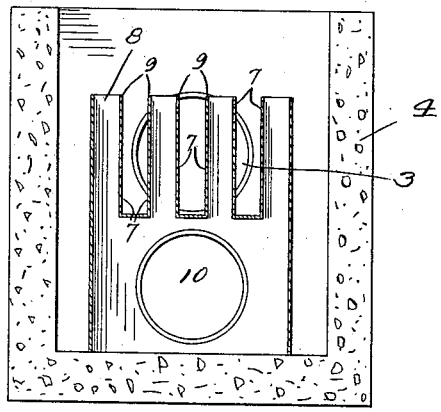

Figure 1 is a top plan view of my improved device connected to the main distributing canal of an irrigation system, disclosing the dam across the canal, the water pressure accumulator, the overflow reservoir situated therein, in full lines the connection between one side of the dam and the accumulator, and in dotted lines the connection between the overflow reservoir and the opposite side of the dam. Fig. 2 is a sectional view taken on line 2—2—Fig. 1 of the drawings. Fig. 3 is a transverse sectional view of Fig. 1, disclosing more fully the overflow reservoir.

While I have disclosed but one dam and distributing lateral, it is to be understood that a structure as hereinafter described is to be located along the distributing canal wherever it is desired to take water from the canal to distribute over the land to be irrigated.

Referring more particularly to the drawings, wherein like numerals of reference designate corresponding parts throughout the several views, the reference numeral 1 designates a suitable irrigation distributing canal, preferably constructed of concrete, and through which the water flows in the direction of the arrow—Fig. 1, and extending across the canal at a point where each lateral intersects therewith is a suitable removable dam or barrier 2, the upper edge of which falls short of extending to the top of the side walls of the canal. Communicating with the canal 1 immediately adjacent the water retaining side of the dam is an inlet or feed pipe 3 extending to a suitable water accumulator 4 preferably formed of concrete and provided with a suitable discharge outlet 5 through which the water for irrigation is discharged. Positioned within the accumulator, in spaced relation to the walls thereof, is an overflow reservoir 6 preferably oblong in shape, and of a size slightly smaller than the interior of the accumulator 4, and said receptacle 6 is provided with a plurality of upwardly projecting, longitudinally extending, spaced ribs or spillways 7 connected at their lower ends and extending to a height approximately flush with the highest point of the pipe 3 and a suitable distance above the center of the outlet 5, as is necessary to furnish the required inches pressure of water at the discharge outlet. The upper ends of the ribs 7 are open, as at 8, providing overflow edges 9 over which the water flows and into the interior of the reservoir 6, when it attains the required height in the accumulator 4. From the lower part of the overflow reservoir 6 extends a suitable return pipe 10 which conveys the water which flows into the reservoir over the edges 8 thereof back into the main canal immediately below the dam or barrier 2 thereof.

It will be observed that a portion of the water collected by the dam or barrier, will, when it attains a given height, flow through the feed pipe 3 into the accumulator 4, from where it is distributed over the land to be irrigated, through the discharge 5. The relative sizes of the discharge outlet 5 and the inlet 3 are such that when water is running over the dam there is more entering the inlet 3 than is capable of being distributed through the outlet 5, and consequently the height of the water increases in the accumulator 4 and as it reaches the tops of the ribs or spillways 7 overflows the edges 9 thereof and enters the interior of the overflow reservoir 6 from where it is conveyed by the pipe 10 back to the distributing canal below the dam or barrier 2 thereof, thus always providing a uniform height of water in the accumulator which insures a uniform discharge pressure at all times. Should the size of the opening 5 be reduced or the opening be closed at any time, the water entering the accumulator 4 through the pipe 3 will not overflow the upper edges of the accumulator 4, but will flow over the edges 9 of the ribs or spillways 7, and be returned to the distributing canal through the pipe 10, but there will be a sufficient height of water in the accumulator 4 to insure the desired head pressure, should the outlet 5 be opened at any time. A suitable cut off gate 11, is mounted for closing the receiving end of the inlet pipe 3 when desired.

Having thus described my invention what is claimed as new and is desired to be protected by Letters Patent is:—

1. In an apparatus for the described purpose and in combination with a water distributing channel, a water pressure accumulator provided with an outlet opening for controlling the water supply to a lateral, a water supply connection between the distributing channel and the accumulator for introducing water thereinto from the distributing channel, a spillway within the accumulator and provided with an inlet opening disposed in a plane above the outlet formed in said accumulator, a return connection between the spillway and the distributing channel for the discharge of the waste water from the accumulator into the distributing channel, and an overflow barrier extending across said channel between said supply and return connections, the upper edge of said barrier terminating at a point below the upper edge of said channel and approximately level with said spillway.

2. In an apparatus for the described purpose and in combination with a water distributing channel, a water pressure accumulator provided with an outlet opening, a water supply connection between the distributing channel and the accumulator, a plurality of spillways within the accumulator and having their inlets disposed in a plane above the outlet formed in said accumulator, a return connection common to all of said spillways extending to the distributing channel, and an overflow barrier extending across said channel between said supply and return connections, the upper edge of said barrier terminating at a point below the upper edge of said channel and approximately level with said spillways.

3. In an apparatus for the described purpose and in combination with a water distributing channel, a water pressure accumulator provided with an outlet opening, a water supply connection between the distributing channel and the accumulator, an overflow reservoir mounted in the accumulator and provided with an overflow opening therein located in a plane above the outlet of the accumulator, a return connection between the overflow reservoir and the distributing channel, and an overflow barrier extending across said channel between said supply and return connections, the upper edge of said barrier terminating at a point below the upper edge of said channel and in a plane with said opening in said overflow reservoir.

4. In an apparatus for the described purpose, and in combination with a water distributing channel, a water pressure accumulator provided with an outlet opening, a water supply connection between the water distributing channel and the accumulator, an overflow reservoir mounted within the accumulator and provided with a plurality of upwardly extending open topped ribs providing spillways, the tops thereof extending to a plane above the outlet for the accumulator, a return connection between the overflow reservoir and the distributing channel, and an overflow barrier extending across said channel between said supply and return connections, the upper edge of said barrier terminating at a point below the upper edge of said channel and in a plane with the tops of said ribs.

5. In an apparatus for the described purpose and in combination with a water distributing channel, a water pressure accumulator provided in its side wall with an outlet opening, a valve controlled water supply connection between the distributing channel and the accumulator, an overflow reservoir fixed within the accumulator and provided with a plurality of spaced upwardly extending open topped ribs forming spillways, the tops thereof extending to a plane above the outlet of the accumulator, a return connection between the overflow reservoir and the distributing channel, and an overflow barrier extending across said distributing channel between said supply and return connections, the upper edge of said barrier terminating at a point below the upper edge of said channel and in a plane with the tops of said ribs.

In testimony whereof I have signed my name to this specification in the presence of two subscribing witnesses.

TIMOTHY F. HORNUNG.

Witnesses:
 ROSE HOEY,
 C. F. METTEER.